United States Patent
Spencer (10) Patent No.: US 9,873,403 B2
(45) Date of Patent: Jan. 23, 2018

(54) INFLATOR WITH FLOW WASH STRAINER

(71) Applicant: Key Safety Systems, Inc., Sterling Heights, MI (US)

(72) Inventor: Byron Spencer, Bloomfield, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 29 days.

(21) Appl. No.: 15/022,700

(22) PCT Filed: Sep. 17, 2014

(86) PCT No.: PCT/US2014/056053
§ 371 (c)(1),
(2) Date: Mar. 17, 2016

(87) PCT Pub. No.: WO2015/042126
PCT Pub. Date: Mar. 26, 2015

(65) Prior Publication Data
US 2016/0229372 A1    Aug. 11, 2016

Related U.S. Application Data

(60) Provisional application No. 61/880,039, filed on Sep. 19, 2013.

(51) Int. Cl.
*B60R 21/26* (2011.01)
*B60R 21/264* (2006.01)

(52) U.S. Cl.
CPC ... *B60R 21/264* (2013.01); *B60R 2021/26011* (2013.01)

(58) Field of Classification Search
CPC .................................................. B60R 21/2644
(Continued)

(56) References Cited

U.S. PATENT DOCUMENTS 3,618,980 A * 11/1971 Leising ................. B60R 21/261
102/531
5,542,704 A * 8/1996 Hamilton ................. C06D 5/06
149/36

(Continued)

FOREIGN PATENT DOCUMENTS

DE    19505580 A1    8/1996
DE    19716652 A1    10/1998
(Continued)

*Primary Examiner* — Toan To
(74) *Attorney, Agent, or Firm* — Markell Seitzman (57) ABSTRACT

An airbag inflator (10) has an inflator housing (20) with an internal chamber (11); a pyrotechnic gas generant (8) stored in the internal chamber inside the housing (20) for generating inflation gases upon ignition; a strainer (50) with openings through which the inflation gases pass prior to inflating the airbag; a primary nozzle wall (40) positioned between the strainer and the gas generator; a plenum chamber (12) between the primary nozzle wall (40) and the strainer (50). The primary nozzle wall (40) has a plurality of nozzles (40a, 40b) with nozzle openings (42, 44) oriented radially about the wall which directs gas flow tangentially spiraling laterally onto the strainer while preventing the inflation gas from flowing radially. The tangentially flowing gases impinge an internal face of the strainer laterally causing gas generant particles to recirculate and burn internally and residual debris of a size greater than the openings of the strainer (50) to be swept and settle in the plenum chamber (12) of the housing.

20 Claims, 6 Drawing Sheets

(58) Field of Classification Search
USPC .......................................................... 280/736
See application file for complete search history.

(56) References Cited

U.S. PATENT DOCUMENTS

| | | | | |
|---|---|---|---|---|
| 6,095,558 | A * | 8/2000 | Bayer | ................. B60R 21/2644 |
| | | | | 280/736 |
| 6,796,581 | B2 * | 9/2004 | Karray | .................... B60R 21/26 |
| | | | | 280/741 |
| 7,866,692 | B2 * | 1/2011 | Windhausen | ......... B60R 21/261 |
| | | | | 102/531 |
| 8,333,154 | B2 * | 12/2012 | Fukuyama | ............ B60R 21/261 |
| | | | | 102/530 |
| 9,221,420 | B2 * | 12/2015 | Laubacher | ............ B60R 21/261 |
| 2003/0184067 | A1 * | 10/2003 | Karray | .................... B60R 21/26 |
| | | | | 280/741 |

FOREIGN PATENT DOCUMENTS

| | | |
|---|---|---|
| JP | H07186874 A | 7/1995 |
| WO | 2009010504 A1 | 1/2009 |

\* cited by examiner

INFLATOR WITH FLOW WASH STRAINER

FIELD OF THE INVENTION

This invention relates to airbag inflators generally, more specifically to an improvement in inflator burn efficiency and filtration.

BACKGROUND OF THE INVENTION

Current pyrotechnic inflators for vehicle airbags contain filters to reduce the size of generant particles that are ejected from the inflator and to normalize the temperature of the exit gas.

Such filters can be made of spiral wraps of perforated steel plate. Because particulate builds up on such filters blocking the gas flow, a larger than practical flow area may be required or the perforation hole size may be bigger than desirable. A large portion of generant may be retained unburned in the depth of the filter reducing the inflator's efficiency and increasing its size.

Such compromise means that burning particles of generant ejected from the inflator as projectiles may cause direct damage to the airbag and may also elevate the temperature of the exit gases. It is often necessary to include expensive heat resistant cloth with the airbag or a separate metal heat shield or deflector with the inflator to protect the airbag from such damage.

It is therefore an objective to limit the absolute size of any solid particle ejected with generant gas to less than 20 micron spherical size, to improve burn efficiency of the inflator so that less generant is needed for a given performance, and to reduce performance variability. It is a further objective to be able to modify existing inflators and match their performance for the same or lower cost without requiring depth filtration.

These and other improvements over prior art inflators are achieved by the invention described hereinafter.

SUMMARY OF THE INVENTION

An airbag inflator has an inflator housing with an internal chamber; a pyrotechnic gas generant stored in the internal chamber inside the housing for generating inflation gases upon ignition; a strainer with openings through which the inflation gases pass prior to inflating the airbag; a primary nozzle wall positioned between the strainer and the gas generator; a plenum chamber between the primary nozzle wall and the strainer. The primary nozzle wall has a plurality of nozzles with nozzle openings oriented radially. Each opening lies in a radial plane generally perpendicular to the wall about the wall which directs gas flow tangentially spiraling laterally onto the strainer while preventing the inflation gas from flowing radially. The tangentially flowing gases impinge an internal face of the strainer laterally causing gas generant particles to recirculate and burn internally and residual debris of a size greater than the openings of the strainer to be swept and settle in the plenum chamber of the housing.

Preferably, the inflator housing is a circular short cylindrical pancake shaped structure with a plurality of exit openings for inflation gases to exit. The strainer is a short circular hollow cylinder with an inside diameter larger than the diameter of the primary nozzle wall and the gas generant. The strainer extends internally adjacent the housing to a height at least equal to the size of the exit opening of the housing. The inflation gases must pass through the strainer prior to exiting the housing openings.

The primary nozzle wall is in the form of an annular ring spaced from the strainer. The space between the primary wall and the strainer defines the plenum chamber. The primary nozzle wall is made of sheet metal or a hollow cylindrical tube. The nozzle openings are formed by stamping the sheet metal or hollow cylindrical tube to create the nozzles by cutting and forming scoop shaped depressions or bulges, each having an opening transverse or perpendicular to the wall. The primary nozzle wall has ends joined to form a tubular ring for encircling the gas generant. The ends can be welded, riveted or otherwise fastened together. The openings of the scoop shaped nozzles are oriented parallel to radial lines extending from an axis of the primary nozzle wall when formed as a ring. The primary nozzle wall has a height extending to an upper and a lower surface of the housing thereby sealing the gas generant in the internal chamber wherein the inflation gas must pass through the nozzle openings into the plenum chamber.

The plurality of nozzle openings is arranged in one or more rows around the circumference of the primary nozzle wall to create a cyclonic flow vortex. In a preferred embodiment, the plurality of nozzle openings is arranged in at least two rows of equally spaced nozzle openings, an upper row and a lower row, each row having at least four nozzle openings. The one or more rows extend about the circumference surface of the primary nozzle wall. The nozzle openings of each row are equal in number and equally spaced between openings.

The openings within one row are aligned with openings in each adjacent row or alternatively can be staggered. In a most preferred embodiment, the primary nozzle wall has one or more upper rows of nozzle openings facing in a first direction for receiving inflation gases and one or more lower rows facing in a second opposite direction for receiving gas flows. The gas flows tangentially into an upper portion of the strainer in the first direction and tangentially in a second opposite direction into a lower portion of the strainer thereby creating two oppositely directed cyclonic flow vortexes. This creates a gravity uplift region in the mid-center of the inflator which assists in burning generant particles.

The strainer is made of one or more layers of wire mesh. The wire mesh of the strainer has openings sized to 20 microns. Preferably, the strainer is a single layer of fine wire mesh formed into an annular ring. An internal coarse strainer can also be used inside the primary nozzle wall to limit the size of generant particles projected from the inner chamber through the nozzle openings.

BRIEF DESCRIPTION OF THE DRAWINGS

The invention will be described by way of example and with reference to the accompanying drawings in which.

DETAILED DESCRIPTION OF THE INVENTION

Figure 1:
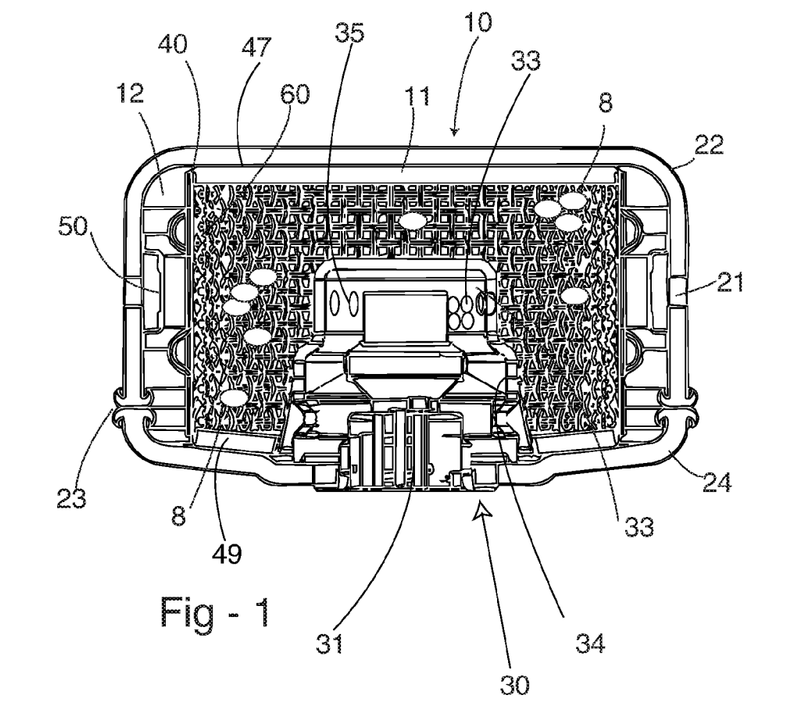
FIG. 1 is a cross-sectional view of the preferred embodiment inflator of the present invention.
Figures 8A, 8B:
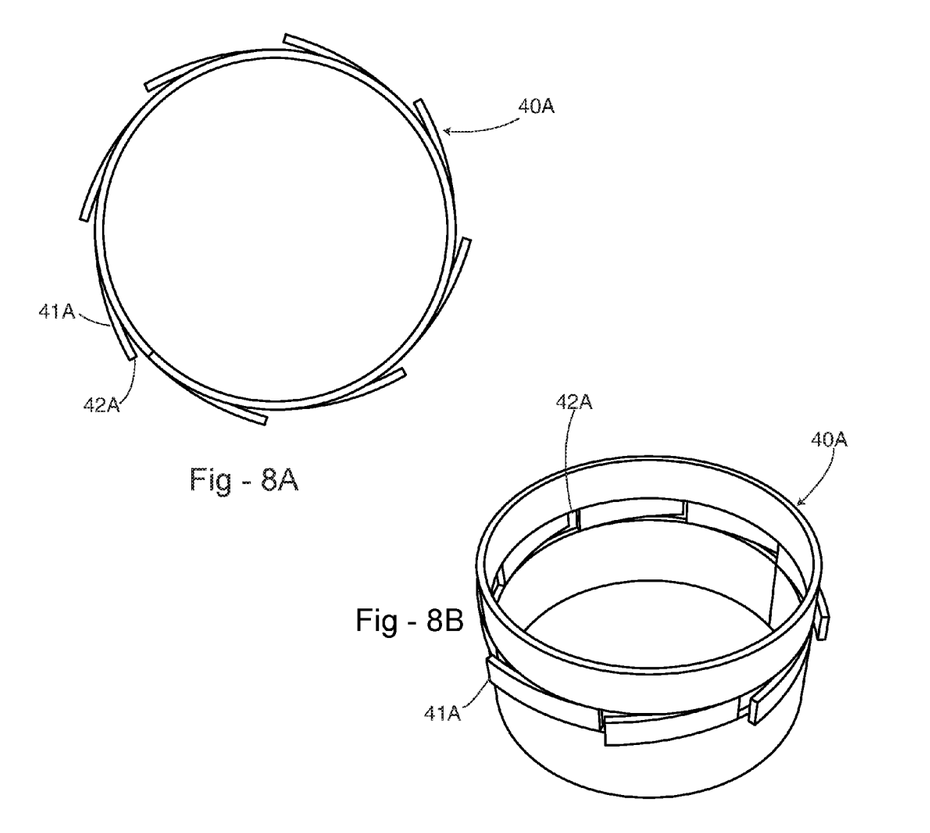
FIGS. 8A, 8B and 8C are views of an alternative embodiment primary nozzle wall having a single row of nozzles with nozzle openings.
Figure 8C:
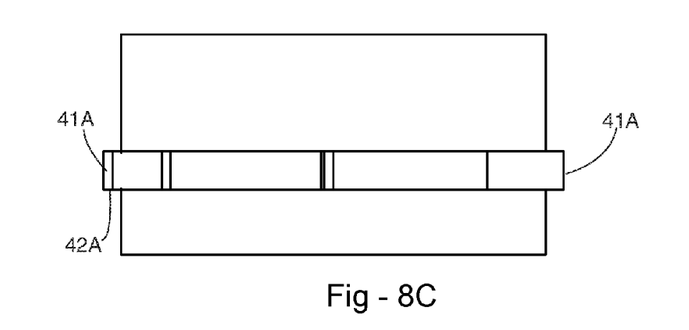

In the invention the filter 500 of a current standard inflator 100 as shown for example in FIG. 8, is replaced by a primary nozzle wall 40 having two sets of nozzles 40a and 40b, as shown for example in FIG. 1, which surrounds an internal coarse mesh strainer 60, with inter-mesh openings 62 located between the nozzle wall 40 and the generant. The strainer cages the generant and permits only generant particles that are small enough to pass through the mesh to enter to the nozzles as they exit the coarse strainer 60.

The strainer 60 can also provide a spring action or is collapsible to reduce the initial volume available to the generant pellets 8 and restrict them from rattling.

The nozzles 40a and 40b in the primary nozzle wall 40 cause particles of the generant to flow in a broadly tangential direction as each enters the annular or outer plenum chamber 12 formed between the nozzle wall 40 and the inflator housing 20. Such flow tends to centrifuge any particles onto the housing 20 wall since they are much denser than the surrounding gas. The exit strainer flanges 51, 53 are purposefully positioned radially inwards of this housing 20 wall. The housing wall 20 includes a plurality of openings 21 disposed circumferentially thereabout.

Figure 1A:
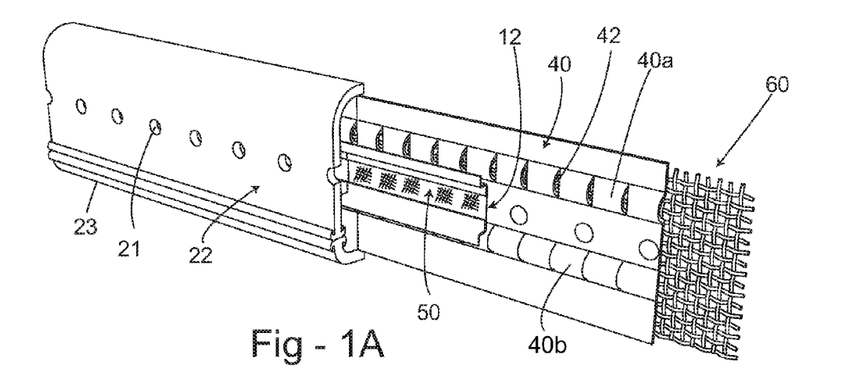
FIGS. 1A and 1B show further details of the present invention.
Figure 1B:
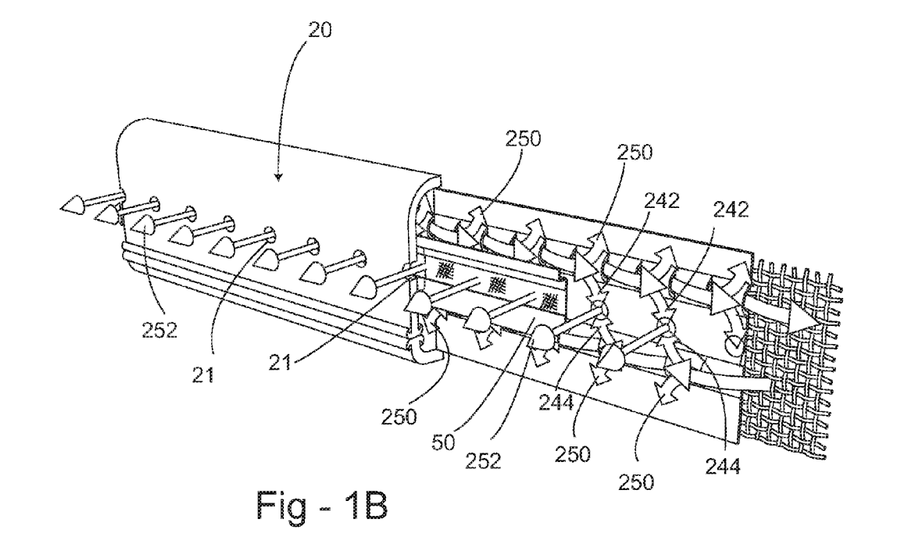
Figure 2:
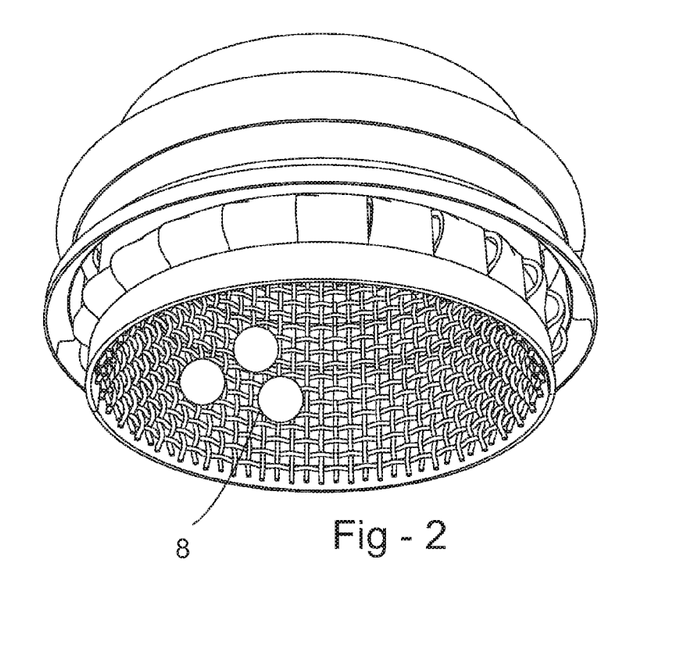
FIG. 2 is a perspective view of a subassembly of the primary nozzle wall with an internal coarse strainer and the external flow wash strainer.
Figure 3:
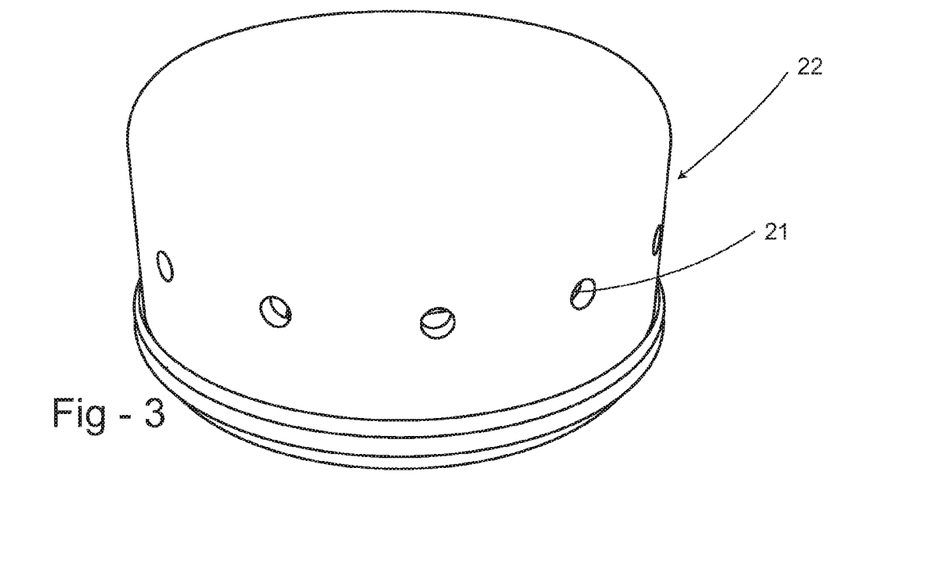
FIG. 3 is an upper or top portion of the housing shown in a perspective view.
Figure 4:
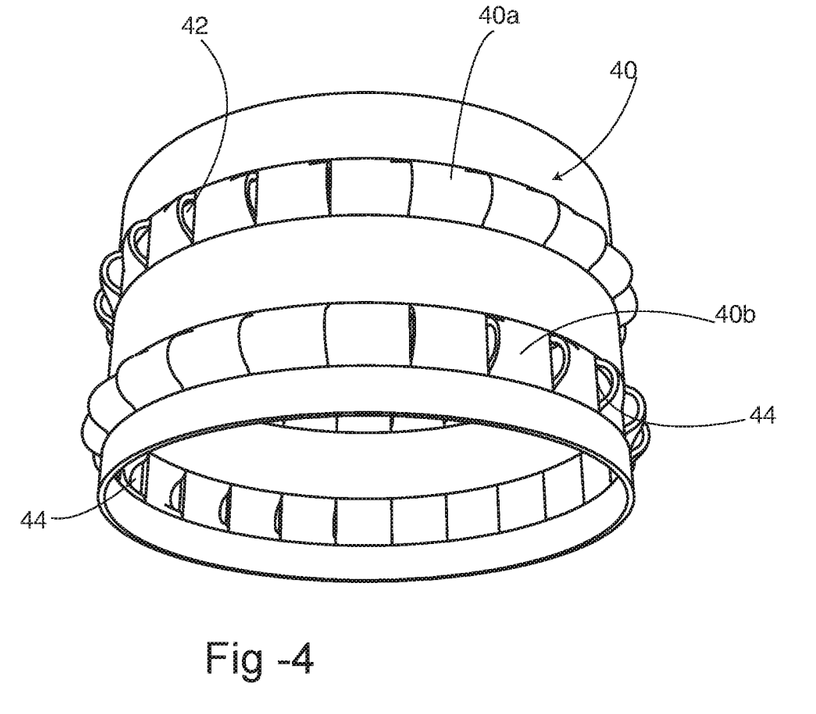
FIG. 4 is a perspective view of the preferred primary nozzle wall shown formed in a ring with two rows of nozzles.
Figure 5:
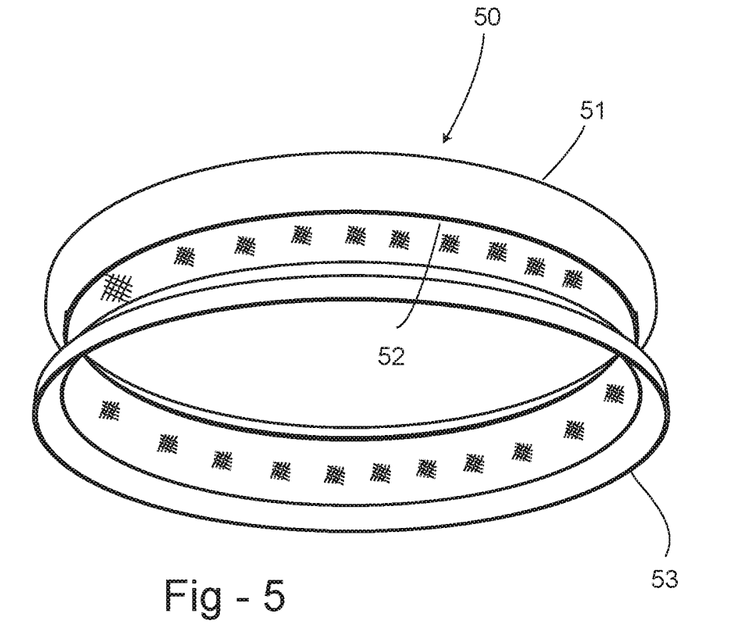
FIG. 5 is a perspective view of the strainer for covering the exit openings of the housing.
Figure 6:
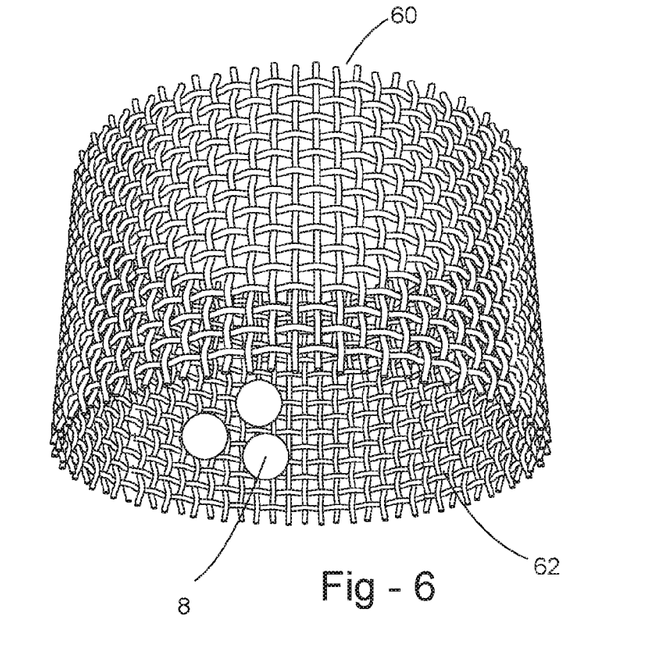
FIG. 6 is a perspective view of an internal coarse wire mesh strainer with a plurality of gas generant pellets.

In the first embodiment two or more rows of nozzles 40a and 40b point in opposite directions both clockwise and counter clockwise feeding into this annular plenum chamber 12 to balance reaction forces and to increase generant gas swirl across the exit strainer 50 in this plenum chamber 12. This positioning of the nozzles is shown in FIG. 1A which is a cutaway section view showing the upper portion 22 with exit openings 21 and lower portion 24 welded together at the seam 23. The strainer 50 is positioned over and spaced inward of the exit openings. The inner coarse mesh strainer 60 is shown inside primary wall 40 with the openings 62. For the purpose of illustration only a section of the strainer 50 shown in FIGS. 1A and 1B.

The nozzle openings 42 and 44 are oriented in a radial plane so the particles projected in a straight path outwardly must strike the nozzle wall 40 prior to being redirected by the nozzle depression or bulge 41, 43 out the respective opening 42, 44. This flow redirection causes the gases to spiral out in the clockwise or counterclockwise in a cyclonic rotation. This rotation washes particle debris from the strainer 50 causing the debris to fall to the bottom of the plenum chamber 12 as the gases escape out the exit openings 21. The outlets or openings 42, 44 from these rows of nozzles are arranged so that they cause a swirling flow across the surface of the exit strainer 50 to wash it clean of particles that are too large to pass through it. The swirling flow across the exit strainer 50 from each of the sets of nozzle openings 42, 44 is shown by arrows 242 and 244. A portion of the exit strainer 50 has been removed in FIG. 1B to show the swirling flow pattern that is located behind the strainer 50. The nozzles 40a and 40b also create a flow pattern urging some of the particulates in the gas stream to move away from the exit strainer 50. This flow pattern is shown by arrows 250. The exit strainer 50 provides a simple surface with little depth or geometry that could trap or jam such particles. The strainer 50 limits the absolute size of particles in generant gas exiting the inflator 10 and would quickly block if not continuously washed clean by such internal swirling flow. Any strainer micron size can be chosen but something of the order of 20 microns might be needed. Without the flow washing concept this would require an unacceptably large surface area. Arrows 252 show the inflation gas exiting the openings 21 in the inflator housing 20.

The swirl associated with each radial nozzle opening 42, 44 tends to generate a local cyclonic/vortex that accelerates and mixes the gases and causes a centrifugal force on particulate proportional to its mass times velocity squared. The swirl velocity is proportional to the square root of the pressure drop across the first tangential nozzles. So such solid particles tend to be thrown away from the exit and its protective strainer 50 and circulate around the outer housing wall of the annular plenum chamber 12 driven by the velocity of gas exiting the tangential nozzles. Heavier particles are thus preferentially trapped inside the inflator 10 until they are burned small enough to pass these second radial nozzles with exiting generant gas.

The total flow path pressure drop is controlled by the nozzle cross-sectional area and is broadly similar to that of current inflators. But because there are two (sets of) nozzles in parallel, the pressure drop across each set of nozzles will be governed by their respective total cross-sectional areas in the flow. In this design, which is intended to be a minimum change from the current prior art inflator 100, the upstream nozzles have approximately four times the flow area and therefore can be expected to drop only 1/16th of the total pressure.

Of course any distribution of pressure drop can be implemented by design. If approximately one half the total pressure is dropped across each of these nozzle sets, then the gas exit velocity can be reduced to: $1/SQRT(2)=70.7\%$ of the velocity of a current standard inflator for the same volume flow rate. The swirl velocity in the second chamber will also be increased.

Figure 7:
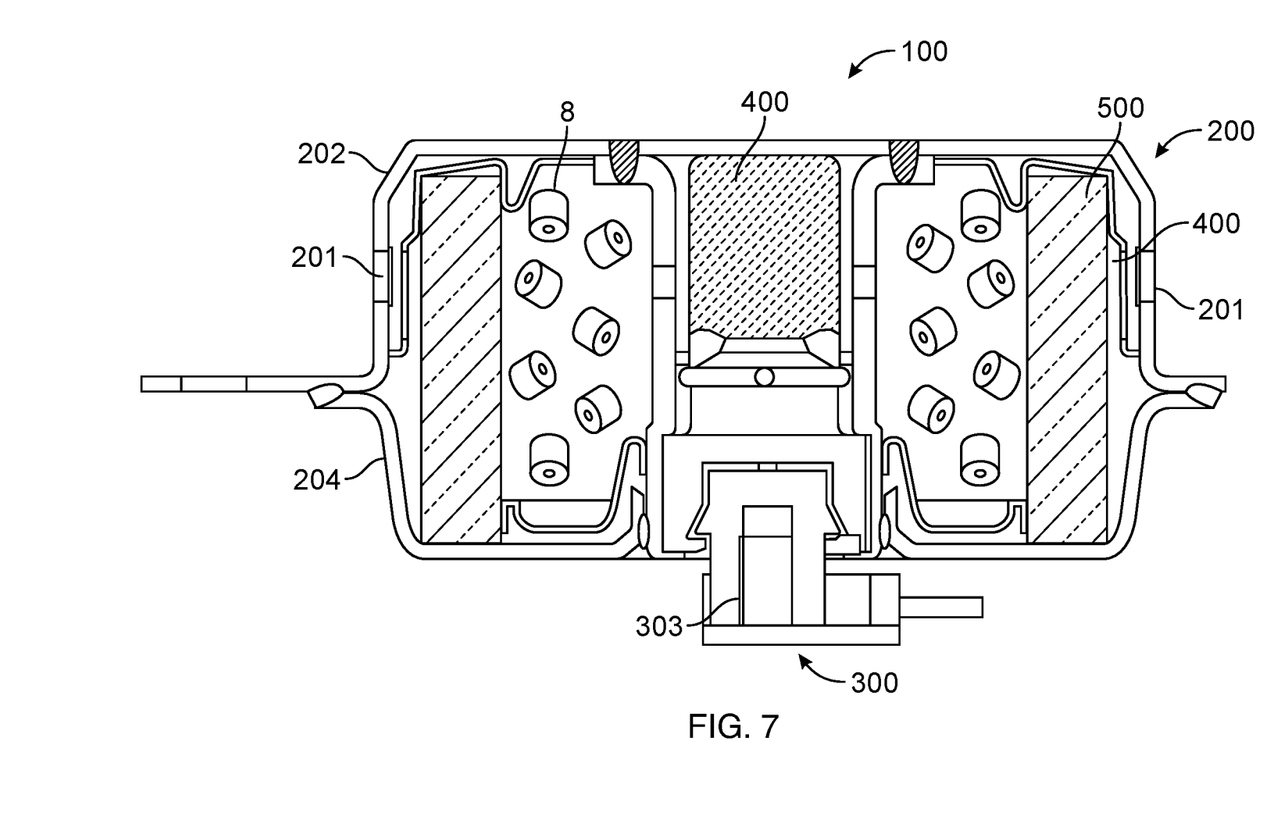
FIG. 7 is a cross-sectional view of an inflator with a conventional depth filter.

Current inflators 100 as shown in FIG. 7 may leave a large percentage of the generant 8 unburned which may in some part be due to trapping in the depth of the filter 500. Particulates in the present invention circulate continuously in the gas stream, and are exposed on all sides and free to burn providing for a more efficient use of generant, less functional variation and therefore require less generant for a given useful output energy.

A depth filter 500 as used in the prior art, by its very nature, blocks some percentage of the particles presented to it and consequently to some extent blocks flow. This blockage is random and therefore characterized by variance which could affect the functional performance of the inflator.

Additionally, the smaller the particle size that is blocked by a traditional filter, the larger its filter area and volume become. So a compromise is reached where unacceptably large particles are allowed to pass out of the inflator in order for its output not to be blocked. The flow washed filter/strainer of the present invention can block particles by design while reducing the inflator size.

As mentioned the present pyrotechnic airbag inflator 10 incorporates a strainer/filter that prevents generant and other particles of unacceptable size exiting with generant gas. Gas flow within the inflator 10 is made to swirl freely in a way that continuously moves blocked particles from the strainer's surface thus permitting it to have a practical flow area and size. A circulating gas flow creates an artificial gravity that preferentially diverts particles of generant away from the exit and permits them to continue to burn.

Returning to the prior art, inflator 100 shown in FIG. 7. This inflator 100 has a housing structure 200 having an upper or top portion 202 and a bottom or lower portion 204 welded together to form the small circular shaped inflator 100. Connected to the bottom portion 204 is an igniter assembly 300 with a squib 302 that reacts to an electrical charge to fire and ignite a small propellant charge 400. The flame from that ignites gas generant pellets 8 to rapidly produce inflation gases under pressure. These inflation gases pass through a ring shaped depth filter 500 designed to prevent particles from exiting the housing through the plurality of exit openings 201. Each opening has a burst disk covering it to prevent moisture from damaging the generant pellets. These burst disks rupture once the internal pressure builds up allowing the inflation gases to escape to inflate an airbag.

As shown, the top of depth filter 500 has a deflector plate 600 extending like a skirt blocking the exit opening 201 of the housing. This helps prevent hot particles from being expelled as an added safety precaution. The filter 500 can clog and absorb unburned generant. This adversely affects inflation performance. The present invention described hereinafter prevents these problems.

Returning to FIG. 1, the inflator 10 further has a housing 20 with an upper portion 22 and a lower portion 24 welded together along a seam weld 23. The bottom portion 24 has an igniter assembly 30 of a general design with a squib 31 to ignite a pyrotechnic charge 33 stored in an igniter housing 34. Products of combustion then exit a series of openings 35 in the igniter housing which then ignite gas generant pellets 8 stored in the primary chamber 11. All of these igniter components are the same as or similar to those currently found in this style inflator, commonly referred to as a "pancake" or disk shaped inflator. The upper portion 22 of the housing 20 has the exit openings 21 aligned in a row and equally sized and spaced. The housing construction with the row of openings is also commonly found in such inflators. The prior art depth filter 500 used in the prior art is replaced in the present invention inflator 10 and in its place is a combination of components that greatly improves the reliability and performance of these types of inflators.

As previously mentioned the preferred embodiment has a primary nozzle wall 40 in the shape of a ring with a plurality of nozzles 40*a* and 40*b*, with nozzle openings 42, 44 arranged in two rows. These nozzle openings 42 and 44 are equally sized and spaced circumferentially around the wall 40. The wall 40 extends generally from the top to the bottom of the housing 20 and may be connected with an upper 47 and lower 49 spacer and the space inside the wall 40 defines the primary chamber 11 which holds the generant pellets 8. Inside and adjacent the wall 40 is a coarse mesh strainer 60. The coarse mesh strainer 60 limits the size of generant that can pass to the nozzle openings 42, 44. The coarse mesh openings 62 are sized to restrict the size of the pellet 8 that can impinge the openings 62 insuring no blockages can occur. On the exterior or outer side of the primary nozzle wall 40 is a second space or plenum chamber 12. This space 12 receives inflation gases and burns debris and unburned generant particles as they pass through the nozzle openings 42, 44. Once in the plenum chamber 12, these gases must impinge on a strainer 50, the strainer 50 is preferably made of a single layer of fine mesh 52 having a mesh opening sized to limit the size of any debris allowed to pass to the airbag on inflation. In the preferred embodiment, the mesh 52 is sized to 20 microns. The reason such fine sized openings in a single layer are possible is due to the unique directional flow that the inflation gases have as they impinge the strainer 50. As shown, the strainer 50 has upper and lower flanges 51, 53 affixed to the housing upper portion 22 spanning above and below the exit openings 21. The mesh layer 52 is affixed to the flanges 51, 53 to form the strainer 50. All inflation gases must pass through the strainer 50 prior to leaving the housing opening 21 to inflate the airbag (not shown).

With reference to FIG. 2, a perspective view of the primary nozzle wall 40, the strainer 50 and the internal coarse mesh strainer 60 and some exemplary gas generant pellets 8 are shown in the space of the internal primary chamber 11.

FIG. 3 shows the upper housing portion 22 with the exit openings 21.

FIG. 4 depicts a perspective view of the primary nozzle wall 40 with nozzle openings 42 and 44, however the strainer 50 has been removed compared to FIG. 2. As shown, the openings 42, 44 are formed in shallow nozzle depressions or bulges 41, 43 formed in the tubular shaped wall by stamping or die pressing. The openings 42 are aligned in a circumferential extending row, equally sized and spaced all facing in a first direction such that gases passing through the openings 42, 44 of the nozzles 41 are flowing in a counterclockwise spiral swirling in a cyclonic action. On the lower row of openings 44 in the nozzles 43, the openings 44 are equally sized and spaced, but facing opposite those of the upper row openings 42. In this arrangement, the gas flow is spirally moving clockwise creating an opposite cyclonic flow. Where the two flows meet, the cyclonic flows cancel and a mixing flow occurs which allows the unburned gas generant to burn. This cyclonic flow pattern, as previously shown in FIG. 1B, further assists in moving the inflation gases laterally onto the fine mesh 52 which allows the particles to impinge the mesh, knocking debris clear and allowing it to fall to the bottom of the plenum chamber 12. As shown, the two rows of openings 42, 44 are oppositely oriented and this is believed preferred because it cancels torsional forces. However, it is possible to make the primary nozzle wall 40 with both rows 42, 44 oriented the same way or to only use one row of similarly oriented openings 42 or 43 to increase the cyclonic action for washing debris from the strainer 50. In such a case the inflator mounting must be sufficiently strong to absorb any resultant thrust.

As shown in FIG. 5, the strainer 50 is shown with the annular flanges 51, 53 of a "z or n" type shape on each side of the fine mesh layer 52. The flanges 51, 53, which are better shown in FIGS. 2A and 2B, abut the inside wall of the upper housing portion 22. The strainer 50 when inserted has to be sufficiently wide to cover the row of exit openings in the upper housing 22.

In FIG. 6 the coarse mesh inner strainer 60 is shown having mesh openings 62 to control the generant 8 particle size that can pass through to the nozzle openings 42, 44.

FIGS. 8A, 8B and 8C are views of an alternative embodiment primary nozzle wall 40 having a single row of nozzles 41A with nozzle openings 42A. In this embodiment, all the components of the inflator 10 are the same, but the two-row nozzle wall 40 is replaced with the nozzle wall 40A having a single row of nozzles 41A with nozzle openings 42A. In this embodiment, the nozzles 41A are cut out along three sides and flared out from the wall. This alternative construction is a different way of creating the nozzle effect of the present invention. In any single row construction, the depression or bulge nozzle 41, 43 are equally suitable in a single row as previously shown and discussed. In this embodiment as shown, the flow will be counterclockwise. Alternatively, by oppositely facing the nozzles a clockwise flow can be achieved.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag inflator (10) comprises:
an inflator housing (20) with an internal chamber (11);
a pyrotechnic gas generant (8) stored in the internal chamber (11) inside the housing (20) for generating inflation gases upon ignition;
a strainer (50) with openings through which the inflation gases pass prior to inflating the airbag;
a primary nozzle wall (40) positioned between the strainer (50) and the pyrotechnic gas generant; a plenum chamber (12) between the primary nozzle wall (40) and the strainer (50);
wherein the primary nozzle wall (40) has a plurality of nozzles (40a, 40b) with nozzle openings (42, 44) oriented radially about the wall which directs gas flow tangentially spiraling laterally onto the strainer (50) while preventing the inflation gas from flowing radially, the tangentially flowing gases impinge an internal face of the strainer laterally causing gas generant particles to recirculate and burn internally and residual debris of a size greater than the openings of the strainer (50) to be swept and settle in the plenum chamber (12) of the housing (20); and
wherein the plurality of nozzle openings (42, 44) are arranged in rows around the circumference of the primary nozzle wall (40), including one or more upper rows of nozzle openings (42, 44) facing in a first direction for receiving inflation gases and one or more lower rows facing in a second opposite direction for receiving gas flows, wherein the gas flows tangentially into an upper portion of the strainer (50) in the first direction and tangentially in a second opposite direction into a lower portion of the strainer (50) thereby creating two oppositely directed cyclonic flow vortexes.

2. The airbag inflator (10) of claim 1 wherein the inflator housing (20) is a circular short cylindrical pancake shaped structure with a plurality of openings (21) for inflation gases to exit.

3. The airbag inflator (10) of claim 2 wherein the strainer (50) is a short circular hollow cylinder with an inside diameter encircling the primary nozzle wall (40) and the gas generant and extending internally of the housing (20) to a height equal to the distance between upper and lower surfaces of the housing wherein inflation gases must pass through the strainer (50) prior to exiting the housing openings (21).

4. The airbag inflator (10) of claim 1 wherein the primary nozzle wall (40) is in the form of an annular ring spaced from the strainer (50), the space between the primary wall and the strainer defines the plenum chamber (12).

5. The airbag inflator (10) of claim 4 wherein the primary nozzle wall (40) is made of sheet metal having a pair of ends to be joined to form the annular ring or a hollow cylindrical tube.

6. The airbag inflator (10) of claim 5 wherein the nozzle openings (42, 44) are formed by stamping the sheet metal or hollow cylindrical tube to create the nozzles (42, 44) by cutting and forming scoop shaped depressions or bulges each having an opening transverse or perpendicular to the wall.

7. The airbag inflator (10) of claim 6 wherein the primary nozzle wall (40), when made of sheet metal, has ends joined to form a tubular ring for encircling the gas generant.

8. The airbag inflator (10) of claim 7 wherein the ends are welded, riveted or otherwise fastened together.

9. The airbag inflator (10) of claim 7 wherein the openings of scoop shaped nozzles are oriented parallel to radial lines extending from an axis of the primary nozzle wall (40) when formed as a ring.

10. The airbag inflator (10) of claim 1 wherein the primary nozzle wall (40) has a height extending to an upper and a lower surface of the housing (20) thereby sealing the gas generant in the internal chamber wherein the inflation gas must pass through the nozzle openings (42, 44) into the plenum chamber (12).

11. The airbag inflator (10) of claim 1 wherein the plurality of nozzle openings (42, 44) are arranged in at least two rows of equally spaced nozzle openings, an upper row and a lower row, each row having at least four nozzle openings.

12. The airbag inflator (10) of claim 1 wherein the one or more rows extends about the circumference surface of the primary nozzle wall (12).

13. The airbag inflator (10) of claim 11 wherein the nozzle openings (42, 44) of each row are equal in number and equally spaced between openings.

14. The airbag inflator (10) of claim 13 wherein the openings within one row are aligned with openings in each adjacent row.

15. The airbag inflator (10) of claim 13 wherein the openings within each row are staggered relative to an adjacent row.

16. The airbag inflator (10) of claim 1 wherein the strainer (50) is made of one or more layers of wire mesh (52).

17. The airbag inflator (10) of claim 16 wherein the wire mesh (52) of the strainer (50) has openings sized to 20 microns.

18. The airbag inflator (10) of claim 17 wherein the strainer (50) is a single layer of wire mesh (52) formed into an annular ring.

19. An airbag inflator (10) comprises:
an inflator housing (20) with an internal chamber (11);
a pyrotechnic gas generant (8) stored in the internal chamber (11) inside the housing (20) for generating inflation gases upon ignition;
a strainer (50) with openings through which the inflation gases pass prior to inflating the airbag;
a primary nozzle wall (40) positioned between the strainer (50) and the pyrotechnic gas generant; a plenum chamber (12) between the primary nozzle wall (40) and the strainer (50);
wherein the primary nozzle wall (40) has a plurality of nozzles (40a, 40b) with nozzle openings (42, 44) oriented radially about the wall which directs gas flow tangentially spiraling laterally onto the strainer (50) while preventing the inflation gas from flowing radially, the tangentially flowing gases impinge an internal face of the strainer laterally causing gas generant particles to recirculate and burn internally and residual debris of a size greater than the openings of the strainer (50) to be swept and settle in the plenum chamber (12) of the housing (20); and wherein the plurality of nozzle openings (42, 44) are arranged in at least two rows of equally spaced nozzle openings, an upper row and a lower row, each row having at least four nozzle openings.

20. The airbag inflator (10) of claim 19 wherein the inflator housing (20) is a circular short cylindrical pancake shaped structure with a plurality of openings (21) for inflation gases to exit.

* * * * *